US009301020B2

(12) United States Patent
Sun

(10) Patent No.: US 9,301,020 B2
(45) Date of Patent: Mar. 29, 2016

(54) METHOD OF TARGETED AD INSERTION USING HTTP LIVE STREAMING PROTOCOL

(75) Inventor: Wendell Sun, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 651 days.

(21) Appl. No.: 12/956,403

(22) Filed: Nov. 30, 2010

(65) Prior Publication Data
US 2012/0137015 A1 May 31, 2012

(51) Int. Cl.
*G06F 15/16* (2006.01)
*H04N 21/81* (2011.01)
*H04N 21/262* (2011.01)
*H04N 21/44* (2011.01)
*H04N 21/61* (2011.01)
*H04N 21/845* (2011.01)
*H04L 29/06* (2006.01)
*H04L 29/08* (2006.01)

(52) U.S. Cl.
CPC ....... *H04N 21/812* (2013.01); *H04N 21/26258* (2013.01); *H04N 21/44016* (2013.01); *H04N 21/6125* (2013.01); *H04N 21/8456* (2013.01); *H04L 29/06* (2013.01); *H04L 29/06027* (2013.01); *H04L 29/06462* (2013.01); *H04L 29/08576* (2013.01)

(58) Field of Classification Search
CPC .................. H04L 29/06027; H04L 29/06462; H04L 29/06
USPC ........................................................ 709/231
See application file for complete search history.

(56) References Cited

U.S. PATENT DOCUMENTS

| 7,606,926 | B1 | 10/2009 | Chen et al. |
| 7,610,597 | B1 | 10/2009 | Johnson et al. |
| 7,613,735 | B2 | 11/2009 | Yao |
| 2003/0052913 | A1 | 3/2003 | Barile |
| 2003/0149975 | A1 | 8/2003 | Eldering et al. |
| 2004/0163101 | A1 | 8/2004 | Swix et al. |

(Continued)

FOREIGN PATENT DOCUMENTS

WO 2005/086865 A2 9/2005

OTHER PUBLICATIONS

Pantos & May, Apple Inc., HTTP Live Streaming, Internet-Draft, Version 05, Nov. 19, 2010, http://tools.ietf.org/html/draft-pantos-http-live-streaming-05 (23 pages).

(Continued)

*Primary Examiner* — Faruk Hamza
*Assistant Examiner* — Abu-Sayeed Haque
(74) *Attorney, Agent, or Firm* — Byrne Poh LLP

(57) ABSTRACT

A content delivery system and method that receives a request for a content stream that includes splice points. The method receives a playlist that includes an ordered list of media segment files that represent the content stream, and splice point tags, where generation of the media segment files aligns segment boundaries with the splice points in the content stream, and where each splice point tag is in a location in the playlist that corresponds to the position of one of the splice points in the content stream. The method identifies an insertion position in the playlist based on the location of the splice point tags, selects an advertisement segment, inserts the advertisement segment at the insertion position to create a modified playlist, removes the splice point tags from the modified playlist, and sends the modified playlist to the video display device.

30 Claims, 4 Drawing Sheets

(56) References Cited

U.S. PATENT DOCUMENTS

| | | | |
|---|---|---|---|
| 2005/0060745 A1* | 3/2005 | Riedl | G06Q 30/02 725/42 |
| 2007/0038728 A1 | 2/2007 | Jacobs et al. | |
| 2007/0112627 A1 | 5/2007 | Jacobs et al. | |
| 2008/0068500 A1* | 3/2008 | Krause | H04N 5/44508 348/473 |
| 2009/0217318 A1 | 8/2009 | Versteeg et al. | |
| 2009/0228919 A1 | 9/2009 | Zott et al. | |
| 2010/0043022 A1* | 2/2010 | Kaftan | G06Q 30/02 725/34 |
| 2010/0169303 A1 | 7/2010 | Biderman et al. | |
| 2011/0246661 A1 | 10/2011 | Manzari et al. | |
| 2012/0030723 A1 | 2/2012 | Baum et al. | |
| 2012/0079000 A1 | 3/2012 | Calcev et al. | |
| 2012/0079059 A1 | 3/2012 | Fonseca, Jr. et al. | |
| 2012/0079062 A1 | 3/2012 | Fonseca, Jr. et al. | |
| 2012/0272286 A1* | 10/2012 | Pasternak | H04N 21/23424 725/146 |
| 2012/0311649 A1* | 12/2012 | Patten | G06Q 30/02 725/97 |

OTHER PUBLICATIONS

Society of Cable Telecommunications Engineers, Inc., ANSI/SCTE 35 2007, Digital Program Insertion Cueing Message for Cable, 2007, http://www.scte.org/documents/pdf/standards/ANSI_SCTE%2035%202007%20Digital%20Program%20Insertion%20Cueing%20Message%20for%20Cable.pdf (42 pages).

PCT Search Report & Written Opinion, Re: Application #PCT/US2011/061102; Feb. 13, 2012.

Pantos, R., et al, "HTTP Live Streaming; draft-pantos-http-live-streaming-02.txt"; Internet Engineering Task Force; Oct. 5, 2009.

Pantos, R., et al, "HTTP Live Streaming; draft-pantos-http-live-streaming-00.txt"; Internet Engineering Task Force; May 1, 2009.

Pandurang Nayak, "IIS Media Services and Silverlight 3: Redefining Online Multimedia Applications", Microsoft Tech-Ed India 2009, May 2009.

Chris Knowlton, "Creating End-to-End Smooth Streaming Video Solutions with Silverlight and IIS Media Services", Streaming Media East, May 2010.

Alex Zambelli, "IIS Smooth Streaming Technical Overview," Microsoft Corporation, Mar. 2009.

David M. Nelson, "Smooth Streaming Deployment Guide", Microsoft Corporation White Paper, Aug. 2010.

Md. Safiqul Islam, "A HTTP Streaming Video Server with Dynamic Advertisement Splicing", Master of Science Thesis, Royal Institute of Technology (KTH), Mar. 2010.

European Examination Report dated Mar. 17, 2014, in European Patent Application No. 11788744.8.

Notice of Preliminary Rejection (English Translation) in Korean Patent Application No. 10-2013-7017075.

Notice of Preliminary Rejection dated Jun. 10, 2014, in Korean Patent Application No. 10-2013-7017075.

Office Action dated Jan. 4, 2016 in Chinese Patent Application No. 201180057358.2.

Summons to Attend Oral Proceedings and Communication dated Jan. 20, 2015 in European Patent Application No. 11788744.8.

Office Action and Examination Search Report dated Jan. 22, 2015 in Canadian Patent Application No. 2,825,048.

International Preliminary Report on Patentability dated Jun. 4, 2014 in International Application No. PCT/US2011/061102.

* cited by examiner

FIG. 3

PRIOR ART

EXTM3U
EXT-X-TARGETDURATION:10
EXT-X-MEDIA-SEQUENCE:2680
EXTINF:10,
http://media.example.com/fileSequence2680.ts
EXTINF:10,
http://media.example.com/fileSequence2681.ts
EXTINF:10,
http://media.example.com/fileSequence2682.ts
EXT-X-ENDLIST

FIG. 4

EXTM3U
EXT-X-TARGETDURATION:10
EXT-X-MEDIA-SEQUENCE:2680
EXTINF:10,
http://media.example.com/fileSequence2680.ts
EXT-X-SPLICE:OUT
EXTINF:10,
http://media.example.com/fileSequence2681.ts
EXT-X-SPLICE:IN
EXTINF:10,
http://media.example.com/fileSequence2682.ts
EXT-X-ENDLIST

FIG. 5

EXTM3U
EXT-X-TARGETDURATION:10
EXT-X-MEDIA-SEQUENCE:2680
EXTINF:10,
http://media.example.com/fileSequence2680.ts
EXTINF:10,
http://media.example.com/fileAd.ts
EXTINF:10,
http://media.example.com/fileSequence2682.ts
EXT-X-ENDLIST

METHOD OF TARGETED AD INSERTION USING HTTP LIVE STREAMING PROTOCOL

BACKGROUND

HTTP live streaming is a media streaming communications protocol for delivering video content using extended M3U playlists and a list of multimedia chunk files. The multimedia data is specified by a Universal Resource Identifier (URI) to a playlist file (i.e., an ordered list of media URIs and informational tags). Each media URI refers to a media file which is a segment of a single contiguous stream. To play the stream, a client device first obtains the playlist file and then obtains and plays each media file in the playlist. HTTP live streaming does not describe or address the replacement or substitution of the multimedia chunk files, or advertisement insertion in the list of multimedia chunk files.

A current focus for the MSO is the development of targeted advertisement technology (i.e., advertisements that are placed so as to reach consumers based on various traits such as demographics, purchase history, or observed behavior). The Society of Cable Telecommunications Engineers (SCTE) developed and published SCTE 35, the standard that defines the Moving Picture Experts Group (MPEG) format MPEG-2 stream splicing for the purpose of digital program insertion. SCTE 35 defines the messages and structure that allow a multiple system operator (MSO) to insert (i.e., splice) advertisements and other content types into a video broadcast stream.

There is a need for a method and system to translate splice points in a content stream into playlist tags for HTTP live streaming, to align the splice points with the segment media file during encoding or transcoding, and to support the implementation of advertisement insertion or replacement by inserting advertisement segments or replacing an existing advertisement segments with targeted advertisement segments. The presently disclosed invention satisfies this demand.

SUMMARY

Aspects of the present invention provide a content delivery system and method that receives a request for a content stream that includes splice points. The method receives a playlist that includes an ordered list of media segment files that represent the content stream, and splice point tags, where generation of the media segment files aligns segment boundaries with the splice points in the content stream, and where each splice point tag is in a location in the playlist that corresponds to the position of one of the splice points in the content stream. The method identifies an insertion position in the playlist based on the location of the splice point tags, selects an advertisement segment, inserts the advertisement segment at the insertion position to create a modified playlist, removes the splice point tags from the modified playlist, and sends the modified playlist to the video display device.

BRIEF DESCRIPTION OF THE DRAWINGS

FIG. 3 illustrates one embodiment of a playlist generated by the prior art.

FIG. 4 illustrates one embodiment of a playlist generated by the hardware components shown in FIG. 1.

FIG. 5 illustrates one embodiment of a playlist generated by the hardware components shown in FIG. 1.

DETAILED DESCRIPTION

Figure 1:
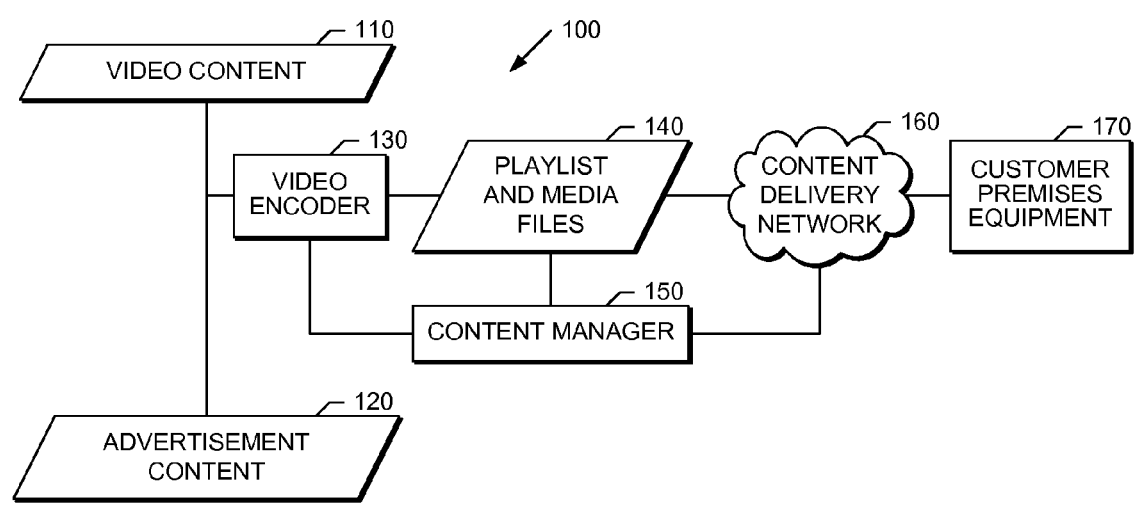
FIG. 1 is a network diagram that illustrates one embodiment of the hardware components of a system that performs the present invention.

FIG. 1 is a network diagram that illustrates one embodiment of the hardware components of a system that performs the present invention. A content delivery system 100 includes a video encoder 130, content manager 150, content delivery network 160, and customer premises equipment 170. The content manager 150 controls the content processing performed by the video encoder 130 to receive the video content 110 and advertisement content 120 and generate the playlist and media files 140, and the delivery of the playlist and media files 140 to the customer premises equipment 170 via the content delivery network 160. The content delivery system 100 shown in FIG. 1 may include any number of interconnected video encoders 130, content managers 150, content delivery networks 160, and customer premises equipment 170.

The video encoder 130, or transcoder, is a computing device that receives the video content 110 and advertisement content 120. In one embodiment, the video content 110 and advertisement content 120 are MPEG-2 transport streams, and the video content 110 includes SCTE 35 splice points. The splice points are an indicator of advertisement insertion in the transport streams, or the beginning or end of an advertisement media segment. For example, if a first splice point indicates an advertisement insertion between two media units in the transport streams, the second splice point and the third splice point are the indication of start and stop location of an advertisement media unit. The video encoder 130 segments the video content 110 and advertisement content 120 into a series of media file segments, and generates a playlist and list of media segment files 140. In one embodiment, the playlist and list of media files 140 is an HTTP live streaming protocol playlist and a list of media segment files. When the video encoder 130 segments the video content 110 and generates the playlist, it aligns (i.e., lines up) the splice points in the content stream with the boundaries of the media segment files. In general, all of the media segment files are the same length according to a pre-defined average duration; however, the aligning of the splice points may cause the last media segment file before a splice point to have a shorter length. An advantage of aligning the splice points is that the splice point will occur before or after a media segment file, but not during the streaming of a media segment file.

The content manager 150 is a computing device that controls the content processing performed by the video encoder 130, and the delivery of the processed content to the customer premises equipment 170. In addition, the content manager 150 manages the metadata for the video content 110 and advertisement content 120, and makes targeted advertisement insertion and advertisement replacement decisions.

The content delivery network 160, in one embodiment, is a public communication network or wide area network (WAN). The present invention also contemplates the use of comparable network architectures. Comparable network architectures include the Public Switched Telephone Network (PSTN), a public packet-switched network carrying data and voice packets, a wireless network, and a private network. A wireless network includes a cellular network (e.g., a Time Division Multiple Access (TDMA), Code Division Multiple Access (CDMA), or Orthogonal Frequency Division Multiplexing (OFDM) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Gigabit Ethernet, Internet Protocol, and Transmission Control Protocol. In various embodiments, the content delivery network 160 will support a variety of network interfaces, including 802.3ab/u/etc., Multimedia over Coax Alliance (MoCA), and 801.11.

The customer premises equipment 170 is a computing device that receives, decodes, and displays data and video content on a video display such as a television. In one embodiment, the customer premises equipment 170 is a set-top box, digital video recorder, home media server, or the like. In one embodiment, the customer premises equipment 170 receives the data and video content as an HTTP live streaming protocol playlist and a list of media segment files.

Figure 2:
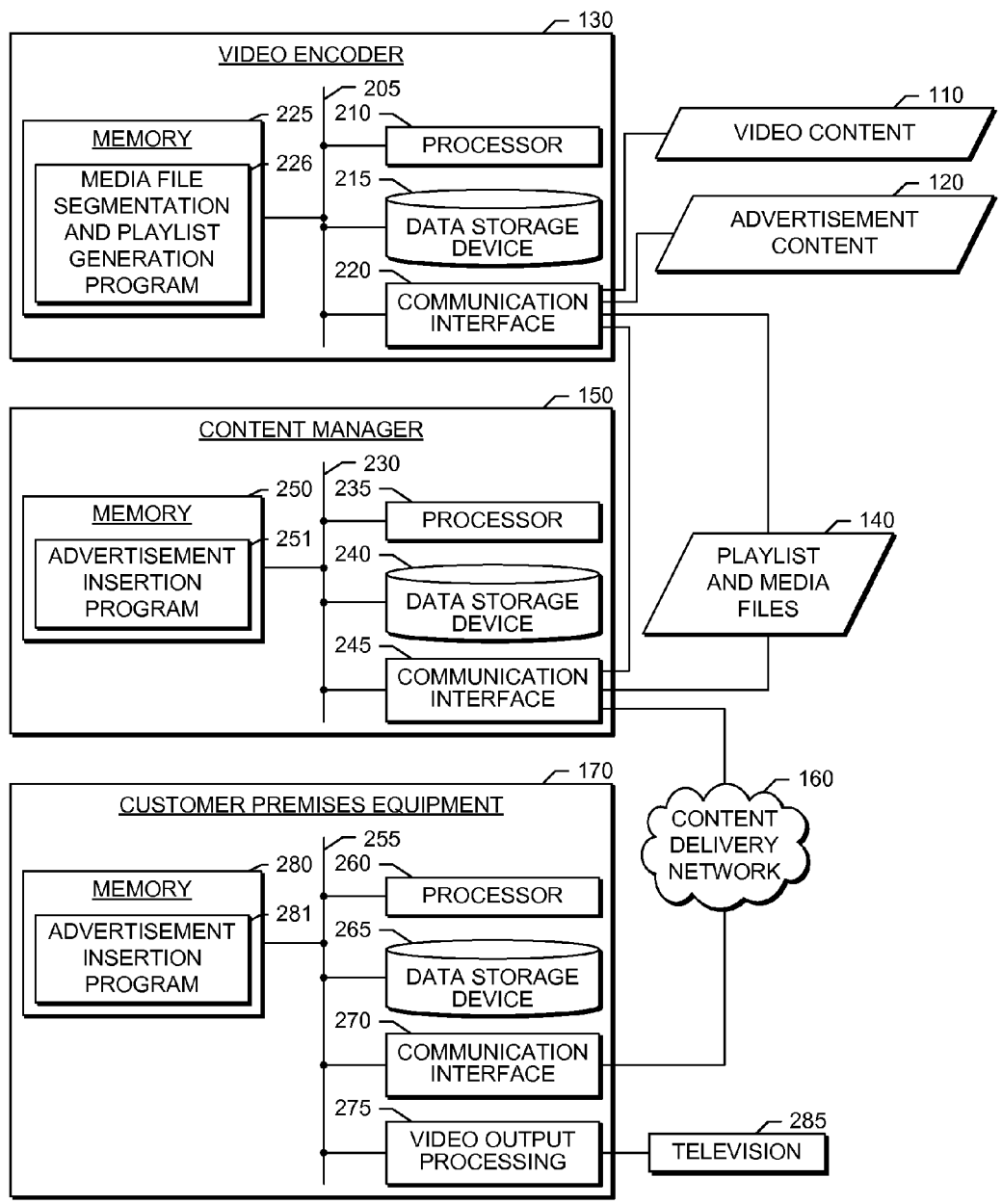
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. In particular, FIG. 2 illustrates the hardware components and software comprising the video encoder 130, content manager 150, and customer premises equipment 170 shown in FIG. 1.

The video encoder 130, in one embodiment, is a general-purpose computing device that performs the present invention. A bus 205 is a communication medium that connects a processor 210, data storage device 215 (such as a Serial ATA (SATA) hard disk drive, optical drive, Small Computer System Interface (SCSI) disk, flash memory, or the like), communication interface 220, and memory 225 (such as Random Access Memory (RAM), Dynamic RAM (DRAM), non-volatile computer memory, flash memory, or the like). The communication interface 220 connects the video encoder 130 to the content manager 150, and allows the video encoder 130 to receive the video content 110 and advertisement content 120, and generate the playlist and media files 140. In one embodiment, the implementation of the present invention on the video encoder 130 is an application-specific integrated circuit (ASIC).

The processor 210 performs the disclosed methods by executing the sequences of operational instructions that comprise each computer program resident in, or operative on, the memory 225. The reader should understand that the memory 225 may include operating system, administrative, and database programs that support the programs disclosed in this application. In one embodiment, the configuration of the memory 225 of the video encoder 130 includes a media file segmentation and playlist generation program 226 that performs the methods of the present invention disclosed in detail in FIG. 6. When the processor 210 performs the disclosed methods, it stores intermediate results in the memory 225 or data storage device 215. In another embodiment, the memory 225 may swap programs, or portions thereof, in and out of the memory 225 as needed, and thus may include fewer than all of these programs at any one time.

The content manager 150, in one embodiment, is a general-purpose computing device that performs the present invention. A bus 230 is a communication medium that connects a processor 235, data storage device 240 (such as a Serial ATA (SATA) hard disk drive, optical drive, Small Computer System Interface (SCSI) disk, flash memory, or the like), communication interface 245, and memory 250 (such as Random Access Memory (RAM), Dynamic RAM (DRAM), non-volatile computer memory, flash memory, or the like). The communication interface 245 connects the content manager 150 to the video encoder 130 and the content delivery network 160, and allows the content manager 150 to receive the playlist and media files 140. In one embodiment, the implementation of the present invention on the content manager 150 is an application-specific integrated circuit (ASIC).

The processor 235 performs the disclosed methods by executing the sequences of operational instructions that comprise each computer program resident in, or operative on, the memory 250. The reader should understand that the memory 250 may include operating system, administrative, and database programs that support the programs disclosed in this application. In one embodiment, the configuration of the memory 250 of the content manager 150 includes an advertisement insertion program 251 that performs the methods of the present invention disclosed in detail in FIG. 6. When the processor 235 performs the disclosed methods, it stores intermediate results in the memory 250 or data storage device 240. In another embodiment, the memory 250 may swap programs, or portions thereof, in and out of the memory 250 as needed, and thus may include fewer than all of these programs at any one time.

The customer premises equipment 170, in one embodiment, is a general-purpose computing device that performs the present invention. A bus 255 is a communication medium that connects a processor 260, data storage device 265 (such as a Serial ATA (SATA) hard disk drive, optical drive, Small Computer System Interface (SCSI) disk, flash memory, or the like), communication interface 270, video output processing 275, and memory 280 (such as Random Access Memory (RAM), Dynamic RAM (DRAM), non-volatile computer memory, flash memory, or the like). The communication interface 270 connects the customer premises equipment 170 to the content data network 160. The video output processing 275 connects the customer premises equipment 170 to a display device such as a television 285, and sends the video content that the television 285 screen displays. In one embodiment, the implementation of the present invention on the customer premises equipment 170 is an application-specific integrated circuit (ASIC).

The processor 260 performs the disclosed methods by executing the sequences of operational instructions that comprise each computer program resident in, or operative on, the memory 280. The reader should understand that the memory 280 may include operating system, administrative, and database programs that support the programs disclosed in this application. In one embodiment, the configuration of the memory 280 of the customer premises equipment 170 includes an advertisement insertion program 281 that performs the methods of the present invention disclosed in detail in FIG. 6. When the processor 260 performs the disclosed methods, it stores intermediate results in the memory 280 or data storage device 265. In another embodiment, the memory 280 may swap programs, or portions thereof, in and out of the memory 280 as needed, and thus may include fewer than all of these programs at any one time.

FIG. 3 illustrates one embodiment of a playlist generated by the prior art. In particular, the playlist illustrated in FIG. 3 is an extended M3U playlist and an ordered list of media chunk files generated by a prior art encoder. When a receiving device, such as the customer premises equipment 170, requests a sequential multimedia streaming session, it downloads an extended M3U playlist, such as the playlist shown in FIG. 3, which contains the metadata that identifies the various sub-streams which are available. M3U is a computer file format that stores multimedia playlists a plain text file that specifies the locations of one or more multimedia files that a media player should play. Each line in an M3U file carries one specification that includes either an absolute local pathname, a local pathname relative to the M3U file location, or a URL. The M3U file can also include comments, prefaced by the "#" character, however in extended M3U, the "#" character also introduces extended M3U directives.

The customer premises equipment 170 receives a uniform resource location (URL) for the playlist shown in FIG. 3. When the customer premises equipment 170 interprets the playlist, it starts to download the media files one by one following the sequence indicated by the "#EXT-X-MEDIA-SEQUENCE" tag (i.e., fileSequence2680.ts, fileSequence2681.ts, and fileSequence2682.ts). An advantage of using the playlist is that the customer premises equipment 170 can start playing the downloaded files while it is downloading the subsequence files, thereby achieving the effect of media live streaming. One skilled in the art will understand that even though FIG. 3 shows three media segment files in a presentation sequence, the number of media segment files in a presentation sequence is not limited.

The HTTP live streaming protocol specifies that each media file in a playlist is a segment of the overall presentation and must be formatted as an MPEG-2 Transport Stream, and that all media files in the playlist must have the same format. Thus, in one embodiment, the media files specified in the playlist shown in FIG. 3 (i.e., fileSequence2680.ts, fileSequence2681.ts, and fileSequence2682.ts) are MPEG-2 Transport Stream media files. Furthermore, any media content that the present invention inserts into an HTTP live streaming playlist, or uses to replace a media segment in an HTTP live streaming playlist, must also be formatted as an MPEG-2 Transport Stream, and have the same format as the other media segment files in the playlist.

FIG. 4 illustrates one embodiment of a playlist generated by the hardware components shown in FIG. 1. In particular, FIG. 4 illustrates the extended M3U playlist shown in FIG. 3 that includes splice points on the assumption that the middle media segment file (i.e., fileSequence2681.ts) is the advertisement media.

The present invention relies upon the description in SCTE 35 of MPEG-2 stream splicing for the purpose of digital program insertion. Specifically, the present invention relies upon the definition in SCTE 35 of IN POINT, OUT POINT, PROGRAM IN POINT, PROGRAM OUT POINT, and PROGRAM SPLICE POINT to support advertisement splicing. The SCTE 35 splice points are the indicator of advertisement insertion, or beginning or end of an advertisement media unit. In one embodiment, the first splicing point is an advertisement insertion location between two media units, and the second and third splicing points are the indication of the start and stop location of the advertisement media unit.

To support advertisement insertion or advertisement replacement, the present invention aligns the splice points with the media segment files when the video encoder 130 generates the media segment files. Since all of the media segment files in a presentation are typically the same length based on a pre-defined average duration, when the present invention aligns the splicing points, the last media segment file before a splicing point may have a shorter than normal length. This is acceptable, however, because the playlist contains individual media segment tags (i.e., the EXTINF tag) that describe the duration for each media segment file. When the media segment files of HTTP live streaming have been aligned with the splicing points carried by the original media source, it also indicates where it is in the playlist file to let the downstream component (i.e., the content manager 150, or customer premises equipment 170) perform an advertisement insertion or advertisement replacement. The present invention achieves this by introducing a new HTTP live streaming tag, EXT-X-SPLICE, that represents, and corresponds to the splice points defined in SCTE 35. The EXT-X-SPLICE tag indicates the splicing point between two media segment files in an HTTP live streaming playlist and has the format "#EXT-X-SPLICE:<IN|OUT|INOUT>". Thus, the EXT-X-SPLICE:IN tag matches to the SCTE 35 IN POINT, the EXT-X-SPLICE:OUT tag matches to the SCTE 35 OUT PONT, and the EXT-X-SPLICE:INOUT tag is used for program insertion when an SCTE 35 OUT POINT and IN POINT are co-located (i.e., a single presentation unit boundary may serve as both a safe place to leave a content stream program and a safe place to enter it).

FIG. 5 illustrates one embodiment of a playlist generated by the hardware components shown in FIG. 1. In particular, FIG. 5 illustrates the extended M3U playlist shown in FIG. 4 with the insertion of advertisement media content (i.e., fileAd.ts) to replace the middle media segment file (i.e., fileSequence2681.ts).

In one embodiment, the content manager 150 performs the advertisement insertion or advertisement replacement on the network-side before any content is delivered to the customer premises equipment 170. In this embodiment, the content manager 150 receives a playlist from the video encoder 130 that includes splice point tags which align the splice points in the content with the boundaries of the media segment files, and manipulates the playlist before sending it to the customer premises equipment 170. In one embodiment, the content manager 150 includes a decision engine that uses a prior art targeted advertisement process to select an advertisement replacement that will target a characteristic or preference of the subscriber using the customer premises equipment 170 to request the content stream. The content manager 150 also selects the advertisement replacement by comparing its encoding to the encoding of the media segment that it will replace to make sure they are the same manner, that the length (i.e., play time) is the same, and that it is a single file segment. Since the content manager 150 controls the workflow of the content publication, before it sends a playlist to the customer premises equipment 170, it scans the splice point tags in the playlist file, inserts or replaces the advertisement media segments, removes the splice point tags from the playlist, and sends the modified playlist that includes the replacement advertisement media content. An advantage of this embodiment is that it does not impact the customer premises equipment 170, or necessitate any changes on the client side, because the advertisement insertion and advertisement replacement decisions and playlist manipulation is performed by the content manager 150. Thus, making the advertisement insertion and advertisement replacement transparent to the subscriber.

In another embodiment, the content manager 150 and the customer premises equipment 170 share the responsibilities to perform the advertisement insertion or advertisement replacement. The content manager 150 receives a playlist from the video encoder 130 that includes splice point tags which align the splice points in the content with the boundaries of the media segment files, and is responsible for making the advertisement insertion and advertisement replacement decision, and communicating the decision to the customer premises equipment 170. The customer premises equipment 170 is responsible for downloading an advertisement media segment, and inserting the advertisement media segment or replacing a media segment with the advertisement media segment after the customer premises equipment 170 receives and interprets the playlist from the content manager 150.

Normally, the present invention may insert an advertisement, or replace an existing advertisement, in an HTTP live streaming playlist without considering time mismatch; however, in a time sensitive scenario, such as live streaming, this has be carefully checked. An advertisement insertion, or advertisement replacement with longer advertisement content, will add delay to the live content delivery. Similarly, an advertisement replacement with shorter advertisement content may cause problems for live streaming because the live segment may not be available when the advertisement replacement finishes. So the length of the advertisement segment, as well as the segmentation of advertisement content must be considered when making an advertisement insertion or advertisement replacement decision.

Figure 6:
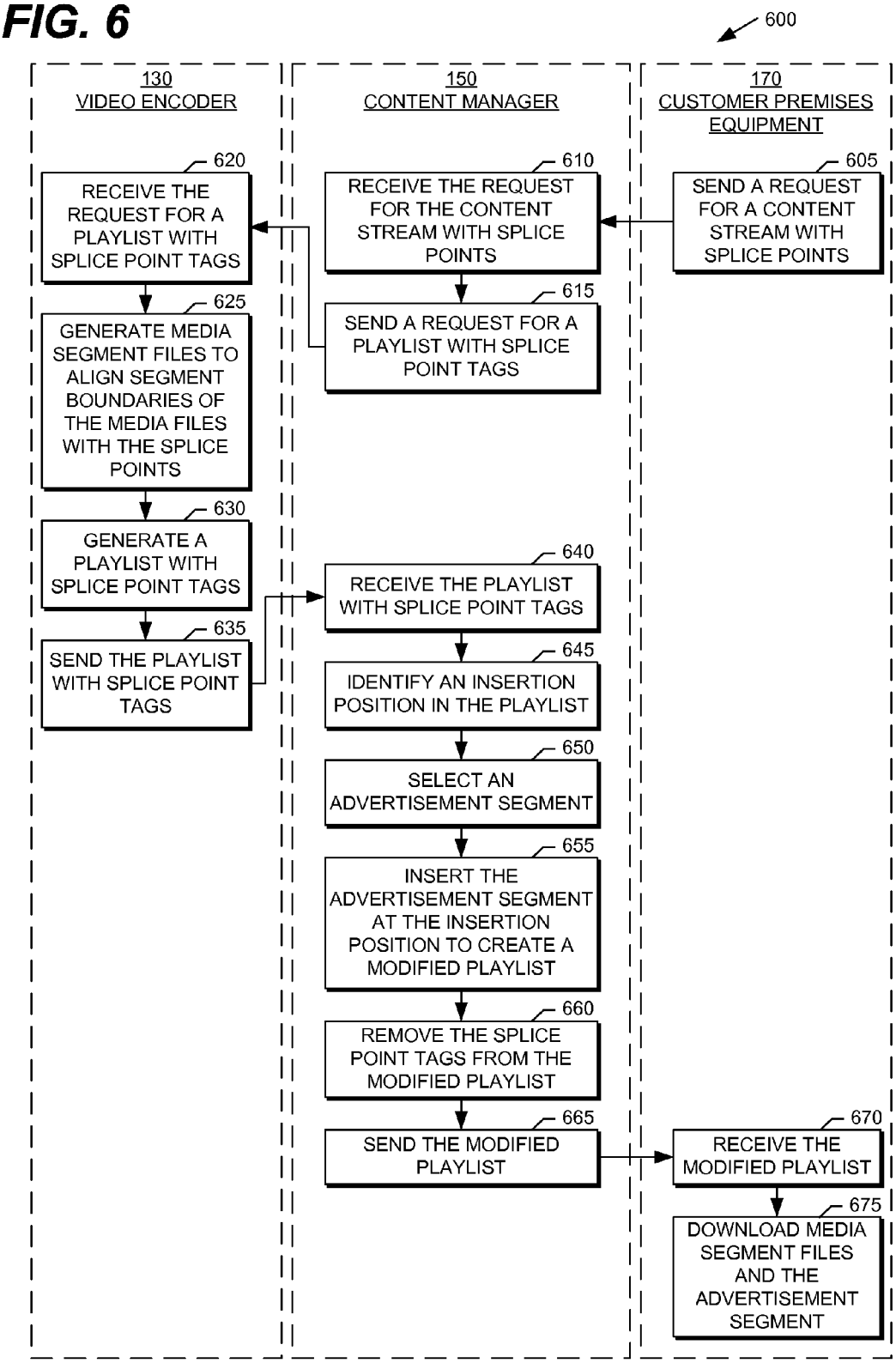
FIG. 6 is a flow diagram that illustrates a method according to one embodiment of the present invention.

FIG. 6 is a flow diagram that illustrates a method according to one embodiment of the present invention. In particular, FIG. 6 illustrates the communication between the video encoder 130, content manager 150, and the customer premises equipment 170.

The process 600 shown in FIG. 6, with reference to FIG. 1 and FIG. 2, begins when a subscriber operates the customer premises equipment 170 to send a request for a content stream that includes splice points (step 605). In one embodiment, the content stream is an MPEG-2 transport stream, and the splice points include SCTE 35 out points and SCTE 35 in points. The content manager 150 receives the request for the content stream that includes splice points (step 610) and sends a request for a playlist with splice point tags (step 615). The playlist includes an ordered list of media segment files that represent the content stream, and splice point tags, where the splice point tags are aligned with the media segment files to correspond to the splice points in the content stream. In one embodiment, the playlist is an HTTP live streaming playlist. The video encoder 130 receives the request for a playlist with splice point tags (step 620), and generates media segment files to align segment boundaries of the media segment files with the splice points (step 625). The video encoder 130 generates the playlist with splice point tags (step 630), and sends the playlist with splice point tags (step 635). Thus, since the playlist includes a list of media segment files and splice point tags, where a location of each splice point tag in the playlist corresponds to a position of a splice point in the content stream, the splice point tags and splice points will occur before or after a media segment file, but not during the streaming of a media segment file. The content manager 150 receives the playlist with splice point tags (step 640). The content manager 150 identifies an insertion position in the playlist (step 645) by scanning the splice point tags in the playlist. In one embodiment, the content manager 150 identifies a start of the insertion position by locating one of the splice point tags that is an out point, and an end of the insertion position by locating one of the splice point tags that is associated with an in point. In another embodiment, the content manager 150 identifies a splice point tag that corresponds to an out point and an in point that are co-located. The content manager 150 then selects an advertisement segment (step 650). In one embodiment, the content manager 150 utilizes a prior art process to determine that the advertising segment is intended to target a characteristic or a preference of a subscriber, determines that an encoding for the advertisement segment matches an encoding for the media segment files, and when the insertion position includes one of the media segment files (i.e., advertisement replacement), determines that a duration of the advertisement segment matches a duration of the advertisement replacement. The content manager 150 inserts the advertisement segment at the insertion position to create a modified playlist (step 655), removes the splice point tags from the modified playlist (step 660), and sends the modified playlist (step 665). In one embodiment, the advertisement segment replaces one of the media segment files in the playlist. In another embodiment, the advertisement segment adds the advertisement segment to the playlist. The customer premises equipment 170 receives the modified playlist (step 670) and downloads the media segment files and advertisement segment that the modified playlist references (step 675).

Although the disclosed embodiments describe a fully functioning method and system for translating splice points in a content stream into playlist tags for HTTP live streaming, the reader should understand that other equivalent embodiments exist. Since numerous modifications and variations will occur to those reviewing this disclosure, the method and system for translating splice points in a content stream into playlist tags for HTTP live streaming is not limited to the exact construction and operation illustrated and disclosed. Accordingly, this disclosure intends all suitable modifications and equivalents to fall within the scope of the claims.

I claim:

1. A method, comprising:
    receiving, from a video display device, a request for a content stream that includes splice points, wherein each splice point is associated with a position in the content stream;
    receiving, from a video encoder, a playlist that includes an ordered list of identifiers that refer to media segment files that represent the content stream, a duration tag for each of the media segment files, and splice point tags, wherein the content stream is segmented into the media segment files and splice points in the content stream are aligned with segment boundaries of the media segment files, wherein each duration tag indicates a duration of a corresponding media segment file, and wherein each splice point tag is in a location in the playlist that corresponds to the position of one of the splice points in the content stream;
    identifying an insertion position that corresponds to a media segment in the playlist that is to be replaced with an advertisement segment based on the location of the splice point tags in the playlist;
    selecting the advertisement segment based at least in part on a value associated with a duration tag corresponding to the media segment to be replaced;
    replacing the media segment with the advertisement segment at the insertion position to create a modified playlist;
    removing the splice point tags from the modified playlist; and
    sending the modified playlist to the video display device for downloading the media segment files and advertisement segment file according to the modified playlist for display on a video display.

2. The method of claim 1, wherein the content stream is a Motion Picture Experts Group 2 (MPEG-2) transport stream that includes a sequence of elementary stream presentation units.

3. The method of claim 1, wherein each splice point is either an out point or an in point, and wherein each out point is a Society of Cable Telecommunication Engineering 35 out point (SCTE35 OUT POINT), and each in point is a Society of Cable Telecommunication Engineering 35 in point (SCTE 35 IN POINT).

4. The method of claim 1, wherein the playlist is a Hypertext Transfer Protocol (HTTP) live streaming playlist.

5. The method of claim 1, wherein the receiving of the playlist further comprises:
sending a request for the playlist.

6. The method of claim 1, wherein the identifying of the insertion position further comprises:
scanning the splice point tags in the playlist;
identifying a start of the insertion position by locating one of the splice point tags that is associated with an out point; and
identifying an end of the insertion position by locating one of the splice point tags that is associated with an in point.

7. The method of claim 1, wherein the advertisement segment is a single media file.

8. The method of claim 1, wherein the selecting of the advertisement segment further comprises:
selecting the advertisement segment based at least in part on a characteristic or a preference of a subscriber and a determination that the advertisement segment is a single file segment; and
when the insertion position includes at least one media segment file, determining that a duration of the advertisement segment matches a duration of play time indicated by the duration tag of said at least one media segment file that the advertisement segment is replacing.

9. The method of claim 1, wherein the inserting of the advertisement segment further comprises:
replacing at least one media segment file with the advertisement segment,
wherein a duration of the advertisement segment matches a duration of play time indicated by the duration tag of said at least one media segment file that the advertisement segment is replacing.

10. The method of claim 1, wherein the sending of the modified playlist further comprises:
sending the media segment files; and
sending the advertisement segment.

11. A content delivery system, comprising:
a content delivery network that connects a video encoder, and a video display device; and
a computing device connected to the video encoder and the content delivery network, the computing device comprising:
a memory device resident in the computing device; and
a processor disposed in communication with the memory device, the processor configured to:
receive a request, from the video display device, for a content stream that includes splice points, wherein each splice point is associated with a position in the content stream;
receive a playlist, from the video encoder, that includes an ordered list of identifiers that refer to media segment files that represent the content stream, a duration tag for each of the media segment files, and splice point tags, wherein the content stream is segmented into the media segment files and splice points in the content stream are aligned with segment boundaries of the media segment files, wherein each duration tag indicates a duration of a corresponding media segment file, and wherein each splice point tag is in a location in the playlist that corresponds to the position of one of the splice points in the content stream;
identify an insertion position that corresponds to a media segment in the playlist that is to be replaced with an advertisement segment based on the location of the splice point tags in the playlist;
select the advertisement segment based at least in part on a value associated with a duration tag corresponding to the media segment to be replaced;
replace the media segment with the advertisement segment at the insertion position to create a modified playlist;
remove the splice point tags from the modified playlist; and
send the modified playlist to the video display device to the video display device for downloading the media segment files and advertisement segment file according to the modified playlist for display on a video display.

12. The content delivery system of claim 11, wherein the content stream is a Motion Picture Experts Group 2 (MPEG-2) transport stream that includes a sequence of elementary stream presentation units.

13. The content delivery system of claim 11, wherein each splice point is either an out point or an in point, and wherein each out point is a Society of Cable Telecommunication Engineering 35 out point (SCTE35 OUT POINT), and each in point is a Society of Cable Telecommunication Engineering 35 in point (SCTE 35 IN POINT).

14. The content delivery system of claim 11, wherein the playlist is a Hypertext Transfer Protocol (HTTP) live streaming playlist.

15. The content delivery system of claim 11, wherein to receive the playlist, the processor is further configured to:
send a request for the playlist.

16. The content delivery system of claim 11, wherein to identify the insertion position, the processor is further configured to:
scan the splice point tags in the playlist;
identify a start of the insertion position by locating one of the splice point tags that is associated with an out point; and
identify an end of the insertion position by locating one of the splice point tags that is associated with an in point.

17. The content delivery system of claim 11, wherein the advertisement segment is a single media file.

18. The content delivery system of claim 11, wherein to select the advertisement segment, the processor is further configured to:
select the advertisement segment based at least in part on a characteristic or a preference of a subscriber and a determination that the advertisement segment is a single file segment; and
when the insertion position includes at least one media segment file, determine that a duration of the advertisement segment matches a duration of play time indicated by the duration tag of said at least one media segment file that the advertisement segment is replacing.

19. The content delivery system of claim 11, wherein to insert the advertisement segment, the processor is further configured to:
replace at least one media segment file with the advertisement segment,
wherein a duration of the advertisement segment matches a duration of play time indicated by the duration tag of said at least one media segment file that the advertisement segment is replacing.

20. The content delivery system of claim 11, wherein to send the modified playlist, the processor is further configured to:
  send the media segment files; and
  send the advertisement segment.

21. A non-transitory computer-readable medium, comprising computer-executable instructions that, when executed on a computing device, perform steps of:
  receiving a request for a content stream that includes splice points, wherein each splice point is associated with a position in the content stream;
  receiving a playlist that includes an ordered list of identifiers that refer to media segment files that represent the content stream, a duration tag for each of the media segment files, and splice point tags, wherein the content stream is segmented into the media segment files and splice points in the content stream are aligned with segment boundaries of the media segment files, wherein each duration tag indicates a duration of a corresponding media segment file, and wherein each splice point tag is in a location in the playlist that corresponds to the position of one of the splice points in the content stream;
  identifying an insertion position that corresponds to a media segment in the playlist that is to be replaced with an advertisement segment based on the location of the splice point tags in the playlist;
  selecting the advertisement segment based at least in part on a value associated with a duration tag corresponding to the media segment to be replaced;
  replacing the media segment with the advertisement segment at the insertion position to create a modified playlist;
  removing the splice point tags from the modified playlist; and
  sending the modified playlist to the video display device for downloading the media segment files and advertisement segment file according to the modified playlist for display on a video display.

22. A method, comprising:
  receiving a request for a playlist with splice point tags for a content stream, wherein the a content stream includes splice points, wherein each splice point is associated with a position in the content stream;
  segmenting the content stream into media segment files to align segment boundaries for the media segments files with splice points in the content stream;
  generating the playlist for the content stream, the playlist including an ordered list of identifiers that refer to the media segment files that represent the content stream, a duration tag for each of the media segment files, and splice point tags, wherein each duration tag indicates a duration of a corresponding media segment file, and wherein each splice point tag is in a location in the playlist that corresponds to the position of one of the splice points in the content stream;
  selecting the advertisement segment such that the duration of the selected advertisement segment matches the duration specified in the duration tag corresponding to the media segment to be replaced;
  replacing the media segment with the advertisement segment at the insertion position to create a modified playlist;
  removing the splice point tags from the modified playlist; and
  sending the modified playlist in response to the request.

23. The method of claim 22, wherein the content stream is a Motion Picture Experts Group 2 (MPEG-2) transport stream that includes a sequence of elementary stream presentation units.

24. The method of claim 22, wherein each splice point is either an out point or an in point, and wherein each out point is a Society of Cable Telecommunication Engineering 35 out point (SCTE35 OUT POINT), and each in point is a Society of Cable Telecommunication Engineering 35 in point (SCTE 35 IN POINT).

25. The method of claim 22, wherein the playlist is a Hypertext Transfer Protocol (HTTP) live streaming playlist.

26. A content delivery system, comprising:
  a content delivery network that connects a content manager, and a video display device; and
  a computing device connected to the content manager and the content delivery network, the computing device comprising:
    a memory device resident in the computing device; and
    a processor disposed in communication with the memory device, the processor configured to:
      receive a request for a playlist with splice point tags for a content stream, wherein the content stream includes splice points, wherein each splice point is associated with a position in the content stream;
      segment the content stream into media segment files to align segment boundaries for the media segments files with splice points in the content stream;
      generate the playlist for the content stream, the playlist including an ordered list of identifiers that refer to the media segment files that represent the content stream, a duration tag for each of the media segment files, and splice point tags, wherein each duration tag indicates a duration of a corresponding media segment file, and wherein each splice point tag is in a location in the playlist that corresponds to the position of one of the splice points in the content stream;
      select the advertisement segment such that the duration of the selected advertisement segment matches the duration specified in the duration tag corresponding to the media segment to be replaced;
      replace the media segment with the advertisement segment at the insertion position to create a modified playlist;
      remove the splice point tags from the modified playlist; and
      send the modified playlist in response to the request.

27. The content delivery system of claim 26, wherein the content stream is a Motion Picture Experts Group 2 (MPEG-2) transport stream that includes a sequence of elementary stream presentation units.

28. The content delivery system of claim 26, wherein each splice point is either an out point or an in point, and wherein each out point is a Society of Cable Telecommunication Engineering 35 out point (SCTE35 OUT POINT), and each in point is a Society of Cable Telecommunication Engineering 35 in point (SCTE 35 IN POINT).

29. The content delivery system of claim 26, wherein the playlist is a Hypertext Transfer Protocol (HTTP) live streaming playlist.

30. A non-transitory computer-readable medium, comprising computer-executable instructions that, when executed on a computing device, perform steps of:
  receiving a request for a playlist with splice point tags for a content stream, wherein the content stream includes splice points, wherein each splice point is associated with a position in the content stream;

segmenting the content stream into media segment files to align segment boundaries for the media segments files with splice points in the content stream;

generating the playlist for the content stream, the playlist including an ordered list of identifiers that refer to the media segment files that represent the content stream, a duration tag for each of the media segment files, and splice point tags, wherein each duration tag indicates a duration of a corresponding media segment file, and wherein each splice point tag is in a location in the playlist that corresponds to the position of one of the splice points in the content stream;

selecting the advertisement segment such that the duration of the selected advertisement segment matches the duration specified in the duration tag corresponding to the media segment to be replaced;

replacing the media segment with the advertisement segment at the insertion position to create a modified playlist;

removing the splice point tags from the modified playlist; and sending the modified playlist in response to the request.

* * * * *